(12) United States Patent
Caldwell et al.

(10) Patent No.: US 11,332,086 B2
(45) Date of Patent: May 17, 2022

(54) TRACK ASSEMBLY WITH ELECTRICAL CONNECTION SYSTEM

(71) Applicant: Ford Global Technologies, LLC, Dearborn, MI (US)

(72) Inventors: Robert Clayton Caldwell, Royal Oak, MI (US); Cung K. Chieu, Tecumseh (CA); Joseph Michael Kish, Canton, MI (US); Macit Aktas, Windsor (CA); Glenn Scott, Dexter, MI (US); Ray Kurlonko, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 16/691,768

(22) Filed: Nov. 22, 2019

(65) Prior Publication Data

US 2021/0159653 A1   May 27, 2021

(51) Int. Cl.
| | |
|---|---|
| *B60R 16/03* | (2006.01) |
| *B60N 2/02* | (2006.01) |
| *B60R 16/023* | (2006.01) |
| *H01R 41/00* | (2006.01) |
| *H01R 33/88* | (2006.01) |
| *H02G 3/30* | (2006.01) |
| *B60N 3/00* | (2006.01) |
| *H02K 5/22* | (2006.01) |

(52) U.S. Cl.
CPC .......... *B60R 16/023* (2013.01); *B60N 2/0232* (2013.01); *B60N 3/001* (2013.01); *B60R 16/03* (2013.01); *H01R 33/88* (2013.01); *H01R 41/00* (2013.01); *H02G 3/30* (2013.01); *H02K 5/225* (2013.01)

(58) Field of Classification Search
CPC ....... B60R 16/02; B60R 16/023; B60R 16/03; B60R 16/027; B60N 2/0232; B60N 2/0705; B60N 2/071; B60N 2/0715; B60N 2/0722; B60N 2002/0264; B60N 2002/0272; B60N 2002/024
USPC ....... 296/63, 64, 65.01, 65, 13, 65.15, 65.18
See application file for complete search history.

(56) References Cited

U.S. PATENT DOCUMENTS

| | | |
|---|---|---|
| 4,494,808 A | 1/1985 | Widell et al. |
| 4,919,625 A | 4/1990 | Coutre |
| 6,267,430 B1 | 7/2001 | Cresseaux |
| 7,188,805 B2 | 3/2007 | Henley et al. |

(Continued)

FOREIGN PATENT DOCUMENTS

WO   WO-2015000475 A2 *  1/2015 ............. H02K 11/25

*Primary Examiner* — Dennis H Pedder
(74) *Attorney, Agent, or Firm* — Vichit Chea; Price Heneveld LLP

(57) ABSTRACT

A vehicle track assembly includes a conductive rail coupled to the track assembly. The conductive rail includes an electrically insulative substrate and one or more conductive strips attached to the substrate. The vehicle track assembly further includes a track-mounted component electrically coupled to the conductive rail. The track-mounted component includes a cantilevered biasing member and one or more electrical contacts. The cantilevered biasing member biases the one or more electrical contacts toward the one or more conductive strips to maintain an electrical connection between the one or more electrical contacts and the one or more conductive strips as the track-mounted component is moved along the conductive rail.

14 Claims, 5 Drawing Sheets

(56) References Cited

U.S. PATENT DOCUMENTS

| | | |
|---|---|---|
| 7,429,190 B2 | 9/2008 | Hueber |
| 8,469,728 B1 | 6/2013 | Luksic et al. |
| 2019/0337471 A1* | 11/2019 | Brehm ................. B60N 2/0244 |
| 2020/0189511 A1* | 6/2020 | Ricart ..................... B60N 2/06 |

* cited by examiner

US 11,332,086 B2

TRACK ASSEMBLY WITH ELECTRICAL CONNECTION SYSTEM

FIELD OF THE DISCLOSURE

The present disclosure generally relates to a vehicle track assembly, and more particularly to a conductive rail for a vehicle track assembly.

BACKGROUND OF THE DISCLOSURE

Vehicles are often provided with some degree of adjustability in a cabin of the vehicle. For example, track-mounted components of the vehicle that are provided in the cabin (e.g., seating assemblies) can be adjusted to meet the preferences of occupants of various sizes. Additionally, in some examples, components require an electrical connection to one or more electrical components.

SUMMARY OF THE DISCLOSURE

According to one aspect of the present disclosure, a vehicle track assembly is provided herein. The vehicle track assembly includes a conductive rail coupled to the track assembly. The conductive rail includes an electrically insulative substrate and one or more conductive strips attached to the substrate. A track-mounted component is electrically coupled to the conductive rail. The track-mounted component includes a cantilevered biasing member and one or more electrical contacts. The cantilevered biasing member biases the one or more electrical contacts toward the one or more conductive strips to maintain an electrical connection between the one or more electrical contacts and the one or more conductive strips as the track-mounted component is moved along the rail.

According to another aspect of the present disclosure, a track assembly including a track is provided herein. A conductive rail is coupled to the track. The conductive rails includes an electrically insulative substrate, and one or more conductive strips positioned on the substrate. The track assembly also includes a motor assembly coupled to the track and configured to move in a direction parallel to the track. The motor assembly includes a motor, a housing coupled to the motor, and a cantilevered biasing member coupled to the housing. The cantilevered biasing member extends parallel to the conductive rail. The one or more electrical contacts are coupled to the cantilevered biasing member and are electrically coupled to the motor. The cantilevered biasing member is configured to bias the one or more electrical contacts toward the one or more conductive strips to maintain an electrical connection between the one or more electrical contacts and the one or more conductive strips such that the one or more electrical contacts may provide an electrical connection between the one or more conductive strips and the motor as the motor assembly is moved along the track.

According to yet another aspect of the present disclosure, a vehicle including one or more seat tracks coupled to a floor pan of the vehicle is provided herein. At least one conductive rail is coupled to the one or more seat tracks. The vehicle further includes a seating assembly including a cantilevered biasing member and one or more electrical contacts. The cantilevered biasing member is configured to maintain an electrical connection between the at least one conductive rail and the one or more electrical contacts as the seating assembly is moved along the one or more seat tracks.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
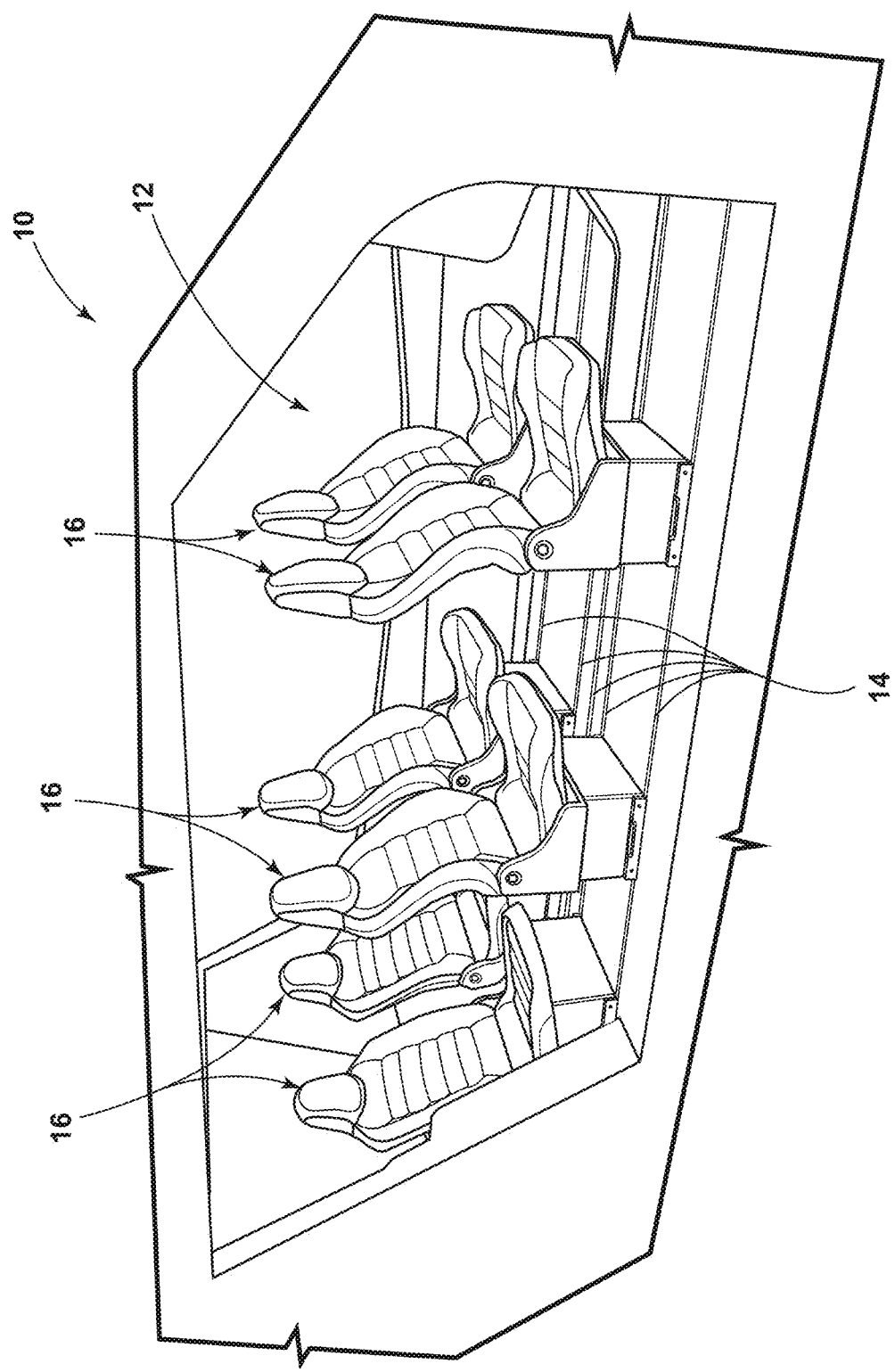
FIG. 1 is a side perspective view of a cabin of a vehicle including a configuration of track assemblies and track-mounted components according to one example.

In this disclosure, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-5B, reference numeral 10 generally designates a vehicle 10. The vehicle 10 includes a cabin 12. In some embodiments, the cabin 12 is a passenger cabin. In other embodiments, the cabin 12 may include an interior cargo space or truck bed. At least one track 14 may be coupled to the cabin 12 of the vehicle 10 and configured to support one or more track-mounted components 16. The track 14 may comprise a conductive rail assembly 18 coupled to an interior portion of the track 14 and extending substantially along the entire length of the track 14. One or more powered components (e.g. motor assembly 20) may be operatively coupled to the track 14 and in electrical communication with the conductive rail assembly 18. In the current embodiment shown, the one or more powered components (e.g. motor assembly 20) are coupled to one or more seats. However, in some embodiments, the one more powered components may be coupled to a floor console, a table, a support structure (e.g. cargo platform), or any other track-mounted component 16 having a powered component requiring an electrical connection to the vehicle 10. The conductive rail assembly 18 may comprise a vehicle connector 22 and a conductive rail 24. The conductive rail 24 may comprise an insulating substrate 26 and one or more conductive strips 28 to conduct electrical current between the vehicle 10 and the motor assembly 20. The motor assembly 20 may comprise a motor 30 coupled to a motor housing 32. In some embodiments, the one or more electrical contacts 38 may be removably coupled to the motor 30 through a motor connector 36. The motor connector 36 to transmit the electrical signals from the one or more electrical contacts 38 to the motor 30. In some examples, the electrical signals may include an electrical voltage to supply power to the one or more track-mounted components 16, a data signal to transmit/receive information between the vehicle 10 and the one or more track-mounted components 16, or a combination thereof. The motor assembly 20 may further include a cantilevered biasing member 34 operably coupled with the motor housing 32. The cantilevered biasing member 34 may be coupled to one or more electrical contacts 38 to bias the one or more electrical contacts 38 toward the conductive rail 24 such that an electrical connection between the vehicle 10 and the motor 30 may be maintained as the motor 30 is moved along the track 14.

Referring again to FIG. 1, the vehicle 10 may be configured as a car, truck, sport-utility vehicle (SUV), passenger van, cargo van, or any other wheeled vehicle. The track 14 may be coupled to vehicle 10. In the current embodiment, the track 14 is coupled to a bottom surface of the cabin 12; however, it is contemplated that the track 14 may be coupled to one or more other surfaces of the vehicle 10. This includes, but is not limited to, an interior ceiling of the vehicle, one or more interior walls of the vehicle, one or more exterior surfaces of the vehicle (e.g., a truck bed, etc.). The more track-mounted components 16 may be coupled to the track 14. The track-mounted components 16 may include a seat, a bench, a floor console, a storage box, a support surface (e.g., a table, a cargo platform, etc.), an entertainments system, or the like. The one or more track-mounted components 16 may be able to travel longitudinally along the track 14 on which they are mounted. In the embodiment shown in FIG. 1, the track system includes a pair of substantially straight parallel tracks 14 in a longitudinal direction of the vehicle 10. In other embodiments, the track system may comprise a single track and or may comprise curved tracks 14 for moving the one or more track-mounted components laterally within the vehicle 10.

Figure 2:
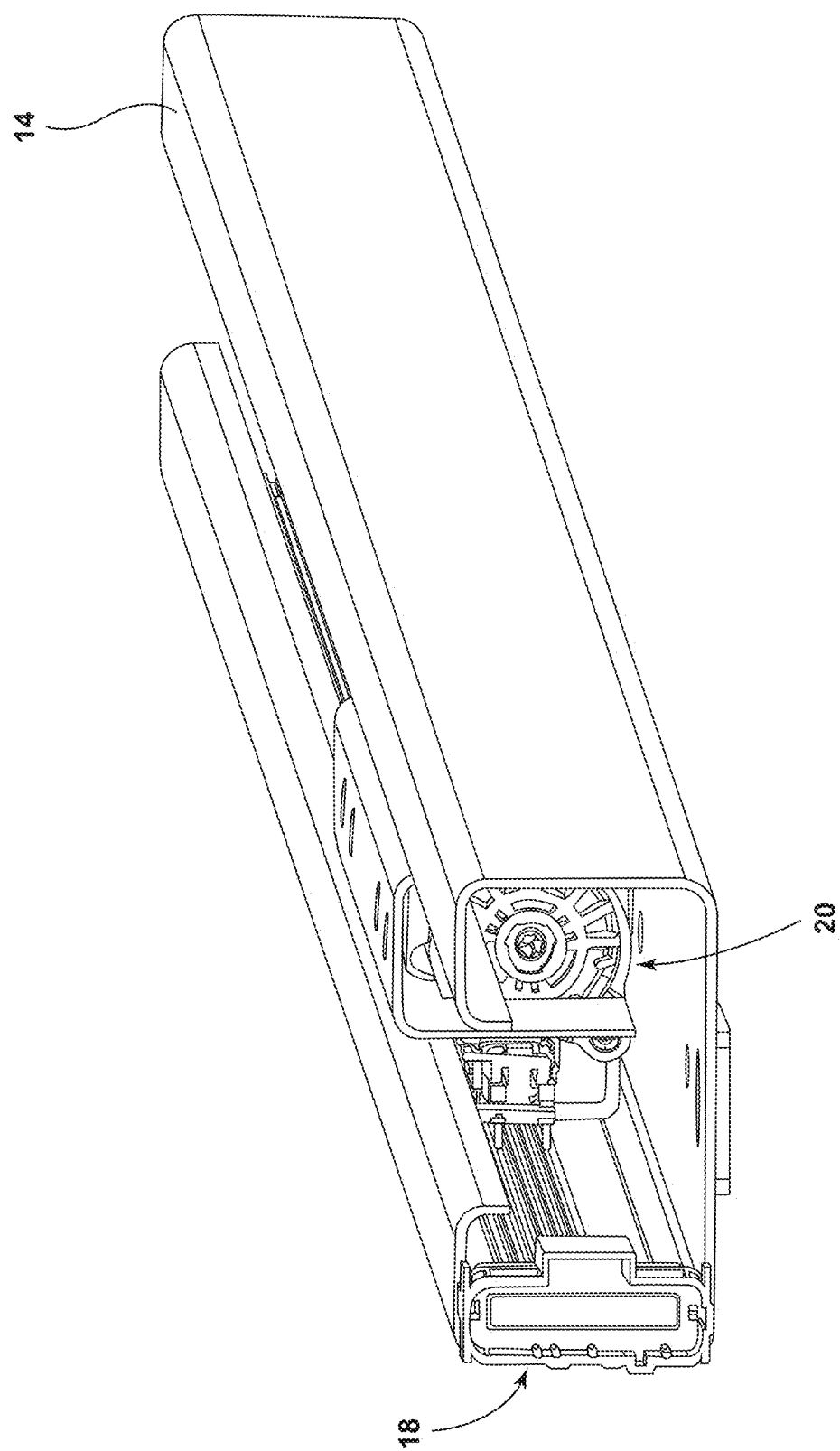
FIG. 2 is a perspective view of a vehicle having a track assembly and motor assembly according to one example.

Referring now to FIG. 2, the one or more track-mounted components 16 may include various features requiring an electrical connection to the vehicle 10. For example, a vehicle seat may have one or more vehicle seat features which may include, but are not limited to, motors for adjusting seating position (e.g., backrest angle, lumbar position, seat depth, seat height, etc.), valves for inflating/deflating various air bladders, seat heaters, fans for ventilated seats, cooling systems, and various massage features. In some embodiments, the track-mounted components 16 may further include one or more control modules (e.g., a seat control module). In some embodiments, the track 14 supports a motor assembly 20 for controlling the for-and-aft position of the track-mounted component 16 along the track 14. The motor assembly 20 may be in electrical communication with vehicle 10 through a conductive rail assembly 18. The conductive rail assembly 18 may be coupled to an interior wall of the track 14 and may extend substantially along the entire length of the track 14 to provide power to the motor assembly 20 as the motor assembly 20 is moved along the track 14. In some embodiments, the conductive rail assembly 18 may be coupled to and/or extend along only a portion of the track 14.

As shown in FIG. 2, the track 14 may comprise a C-shaped structure configured to house one or more components (e.g., motor assembly 20 and the conductive rail assembly 18) within an interior portion of the track. However, in other embodiments the track 14 may be any shape. For example, in some embodiments, the track 14 may comprise an open U-shape allowing for easy removal of the one or more track-mounted components 16 along an intermediate portion of the track 14. In other embodiments, the track may comprise a T-shape with the one or more track-mounted components 16 coupled to an exterior portion of the track. In still other embodiments, the track 14 may comprise one or more L-shaped tracks with the track-mounted components 16 coupled on or between the one or more L-shaped tracks.

Figure 3A:
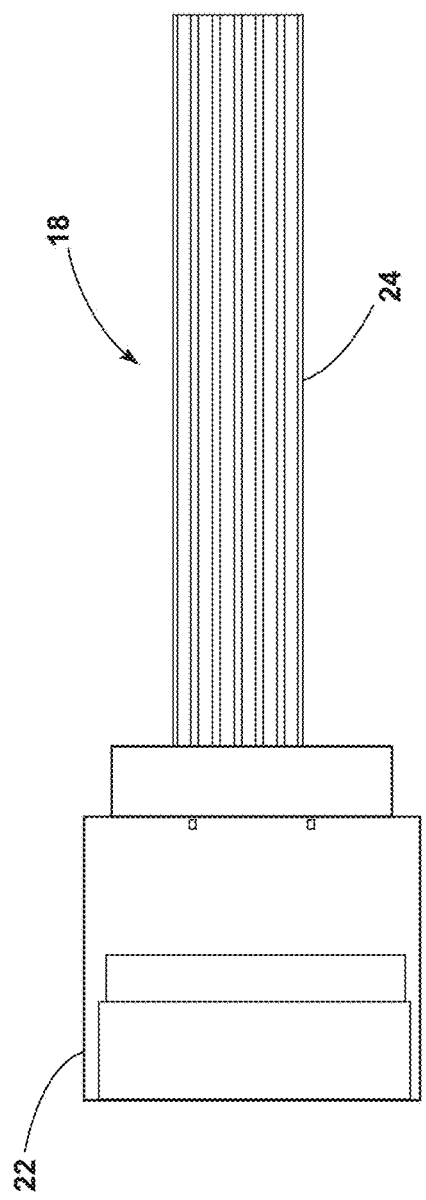
FIG. 3A is a side elevational view of a conductor rail assembly according to one example.
Figure 3B:
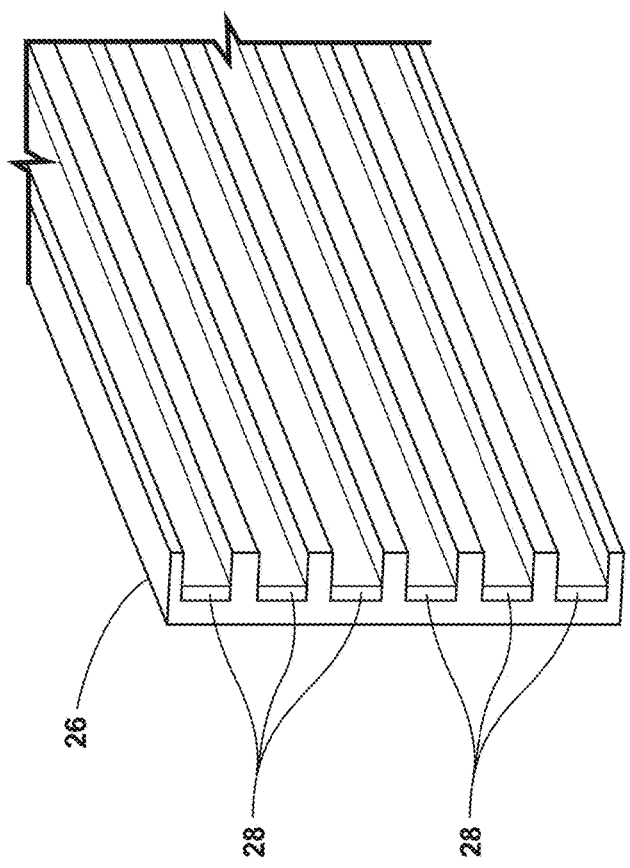
FIG. 3B is a cross-sectional perspective view of the conductor rail of FIG. 3A.

Referring now to FIGS. 3A and 3B, the conductive rail assembly 18 may include a vehicle connector 22 and a conductive rail 24. The vehicle connector 22 may be configured to receive/transmit electronic signals between the conductive rail 24 and the vehicle 10. In some embodiments, the vehicle connector 22 may provide an electrical connection between the conductive rail 24 and one or more electronic control units (ECUs) of the vehicle 10. In some embodiments, the vehicle connector 22 may comprise a plurality of connectors. The conductive rail 24 may include a substrate 26 and one or more conductive strips 28. In one embodiment, the substrate 26 forms one or more channels housing the one or more conductive strips 28. The conductive rail 24 receives/transmits power and/or electronic signals between the vehicle connector and the one or more track-mounted components 16. In some embodiments, the substrate 26 includes one or more attachment features (e.g., an adhesive, an integral attachment feature, one or more holes for receiving a fastener, etc.) for coupling the conductive rail 24 to the track 14. The conductive strips 28 may be coupled to the substrate 26 and may be formed of a suitable electrically conductive material (e.g., copper, gold, etc.). In some embodiments, the conductive strips 28 may be configured to provide an electrical connection between the vehicle connector 22 and a plurality of track-mounted components 16.

In the current embodiment shown, the track 14 includes one conductive rail assembly 18 coupled on an interior side portion of the track 14. In some embodiments, the conductive rail assembly 18 may be coupled to any portion of the track 14 including, but not limited to, one or more exterior surfaces. In some embodiments, the track 14 may include a plurality of conductive rail assemblies 18 coupled to one or more surfaces of the track 14 to provide electrical communication between the vehicle 10 and the one or more track-mounted components 16. Additionally, in embodiments comprising a plurality of tracks 14, a plurality of conductive rail assemblies 18 may be coupled to the plurality of tracks 14 for providing electrical communication to the track-mounted components 16.

Figure 4A:
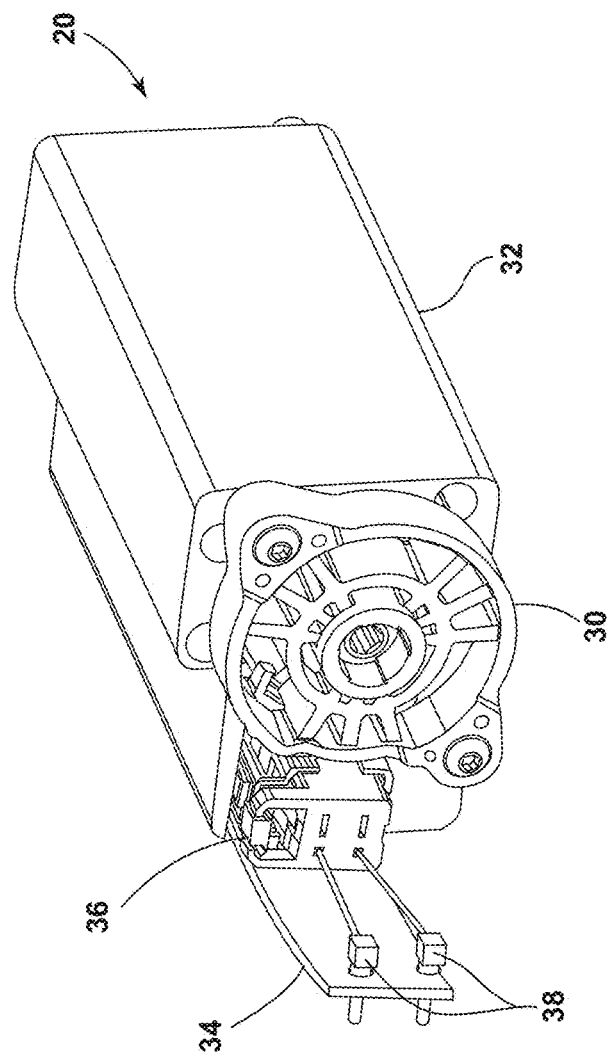
FIG. 4A is a perspective view of a motor assembly according to one example.
Figure 4B:
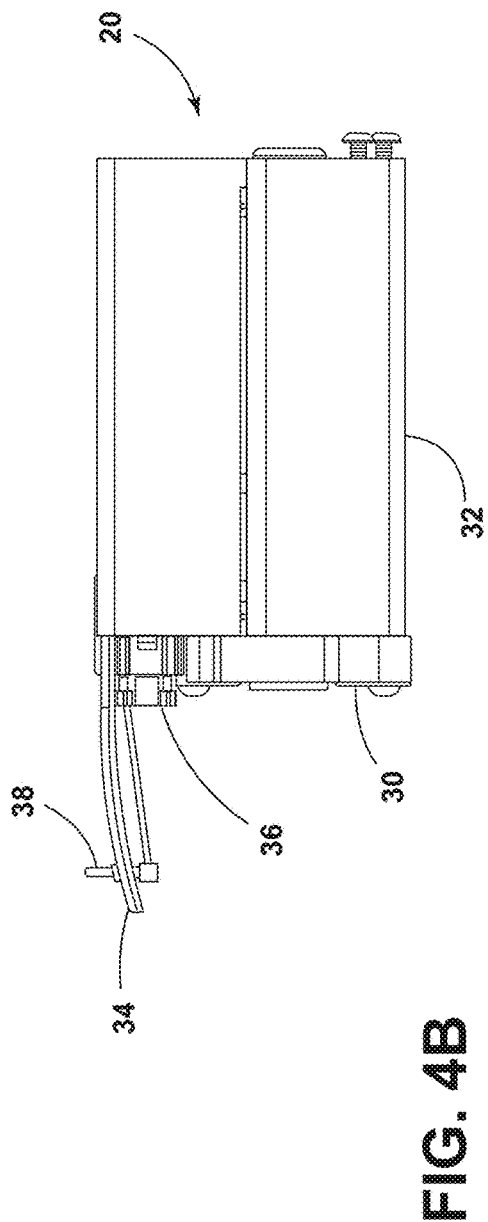
FIG. 4B is a top elevational view of the motor assembly of FIG. 4A.

Referring to FIGS. 4A and 4B, a motor assembly 20 is provided including a motor 30, a motor housing 32, and a motor connector 36. In some embodiments, the motor housing 32 may further include a cantilevered biasing member 34 integrally formed with the motor housing 32 as a single piece. The motor housing 32 may be formed of any suitable material. For example, in some embodiments, the motor housing 32 may be formed of an electrically insulative material. In other embodiments the cantilevered biasing member 34 may be formed separately and subsequently coupled to the motor housing 32.

The cantilevered biasing member 34 may support the one or more electrical contacts 38. The cantilevered biasing member 34 is configured to bias the one or more electrical contacts 38 toward the conductive rail 28 to maintain an electrical connection between the vehicle 10 and the track-mounted component 16. Accordingly, the cantilevered biasing member 34 may be formed of a material having a suitable flexural modulus of elasticity for providing sufficient bias to the one or more electrical contacts 38 to maintain a sufficient contact between the one or more electrical contacts 38 and the one or more conductive rails 28 as the track-mounted component 16 is moved along the track 14. In some embodiments, the cantilevered biasing member 34 is formed with a plurality of prongs each supporting a corresponding electrical contact 38. In other embodiments the cantilevered biasing member 34 may comprise a plurality of cantilevered biasing members 34 each supporting a corresponding electrical contact 38. The cantilevered biasing member 34 may also comprises a variety of shapes (e.g., straight, curved, tapered, etc.) to accommodate various designs of the track 14, the track-mounted components 16, and the conductive rail assembly 18. Additionally, in some embodiments, the cantilevered biasing member may be formed of an electrically insulating material to prevent electricity from being conducted between the one or more electrical contacts 38.

The one or more electrical contacts 38 may be formed of a suitable material for conducting electric current from the conductive rail 24 to the motor connector 36. In one embodiment, the one or more electrical contacts 38 comprises an annular collar extending substantially around the one or more electrical contacts 38 and configured to interact with the cantilevered biasing member 34 to bias the one or more electrical contacts 38 toward the conductive rail 24. In another embodiment, the annular collar may act as an annular integral attachment (i.e. snap-fit) feature to be pushed through an aperture formed in the cantilevered biasing member 34 during assembly. Additionally, the one or more electrical contacts 38 may comprise any shape suitable for the application of sliding along the one or more conductive strips 28. For example, in some embodiments, the one or more electrical contacts 38 may include a rounded tip. In other embodiments, the one or more electrical contacts may include a substantially flat chisel-tip or slanted tip to provide an increased surface area in contact with the one or more conductive rails 28 while still allowing the motor assembly 20 to be moved along the track 14. In some embodiments, the one or more electrical contacts 38 may also include an enlarged portion on an end distal from the conductive rail 24 to prevent the one or more electrical contacts 38 from completely passing through the cantilevered biasing member 34 during installation. In one embodiment, one or more wires may extend from the one or more electrical contacts 38 and couple with the motor connector 36 to provide an electrical connection to the motor.

The motor 30 may comprise any suitable type of motor (e.g., permanent magnet DC motors, stepper motors, brushless motors, etc.) for moving a track-mounted component 16 along the track 14. The motor assembly 20 may also include one or more other components for determining a distance traveled along the track 14 (e.g., an encoder/decoder system in communication with the motor assembly). Additionally, in some embodiments, the track system may include other powered components in electrical communication with the conductive rail 28 in addition to or instead of the motor assembly 20 (e.g., USB ports, AC adaptors, entertainment accessories, control panels, heated or cooled seats, etc.).

Figure 5A:
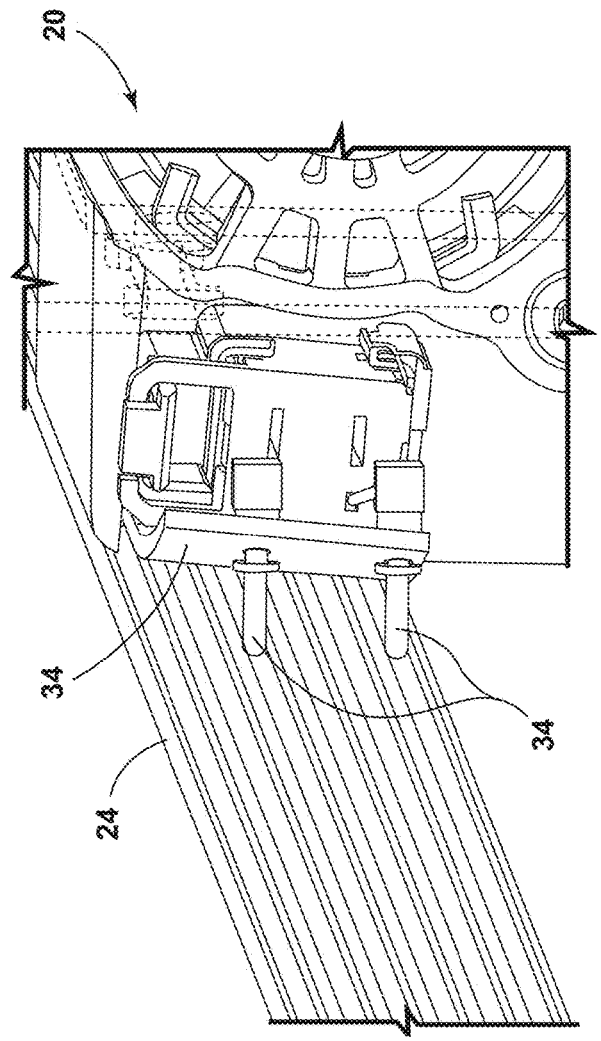
FIG. 5A is an enlarged perspective view of a conductive rail and a motor assembly according to one example.
Figure 5B:
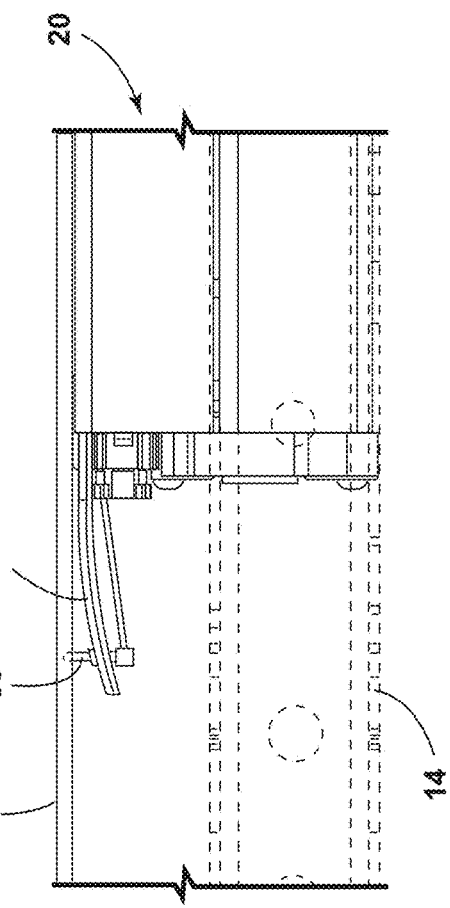
FIG. 5B is an enlarged top elevational view of the conductive rail and motor assembly of FIG. 5A.

Referring now to FIGS. 5A and 5B, in one embodiment, the housing assembly 20 may be positioned within the track 14 such that the one or more electrical contacts 38 are positioned within a corresponding channel of the substrate 26 and in electrical connection with a corresponding conductive strip 28. In some embodiments, the conductive strip 28 transmits electrical power to the track-mounted components 16 (e.g. motor 30) through the one or more electrical contacts 38. In other embodiments, the conductive strip 28 transmits a data signal to the track-mounted components 16 (e.g. motor 30) through the one or more electrical contacts 38. In some embodiments, the conductive rail 24 may include a plurality of conductive strips 28 to provide data/transmit data to a plurality of track-mounted components 16.

According to one aspect of the present disclosure, a vehicle track assembly is provided herein. The vehicle track assembly includes a conductive rail coupled to the track assembly. The conductive rail includes an electrically insulative substrate and one or more conductive strips attached to the substrate. A track-mounted component is electrically coupled to the conductive rail. The track-mounted component includes a cantilevered biasing member and one or more electrical contacts. The cantilevered biasing member biases the one or more electrical contacts toward the one or more conductive strips to maintain an electrical connection between the one or more electrical contacts and the one or more conductive strips as the track-mounted component is moved along the rail.

Embodiments of the first aspect of the disclosure can include any one or a combination of the following features:
- the cantilevered biasing member includes an electrically insulative material;
- the conductive rail provides electrical power to a motor;
- the one or more electrical contacts are removably coupled to the motor;
- the cantilevered biasing member is integrally formed with a motor housing;
- at least one of the one or more conductive strips transmit a data signal;
- the one or more electrical contacts include a rounded tip;
- the cantilevered biasing member includes a plurality of cantilevered biasing members each corresponding to one or the one or more electrical contacts;
- the cantilevered biasing member includes a plurality of prongs wherein each of the plurality of prongs is associated with one of the one or more electrical contacts;
- the one or more electrical contacts further include an annular collar coupled to the cantilevered biasing member;
- the conductive rail extends along the entire length of the track assembly; and
- at least one of the one or more electrical contacts provides electrical power to the track-mounted component and another of the one or more electrical contacts provides a data signal to the track mounted component.

According to another aspect of the present disclosure, a track assembly including a track is provided herein. A conductive rail is coupled to the track. The conductive rails includes an electrically insulative substrate, and one or more conductive strips positioned on the substrate. The track assembly also includes a motor assembly coupled to the track and configured to move in a direction parallel to the track. The motor assembly includes a motor, a housing coupled to the motor, and a cantilevered biasing member coupled to the housing. The cantilevered biasing member extends parallel to the conductive rail. The one or more electrical contacts are coupled to the cantilevered biasing member and are electrically coupled to the motor. The cantilevered biasing member is configured to bias the one or more electrical contacts toward the one or more conductive strips to maintain an electrical connection between the one or more electrical contacts and the one or more conductive strips such that the one or more electrical contacts may provide an electrical connection between the one or more conductive strips and the motor as the motor assembly is moved along the track.

Embodiments of the second aspect of the disclosure can include any one or a combination of the following features:
- the housing includes an electrically insulative material;
- the cantilevered biasing member is integrally formed with a motor housing;
- the motor assembly is coupled to one of a seat, a floor console, a table, a support structure, or a combination thereof; and
- the motor assembly further includes a motor connector such that the one or more electrical contacts are removably coupled to the motor.

According to a third aspect of the present disclosure, a vehicle including one or more seat tracks coupled to a floor pan of the vehicle is provided herein. At least one conductive rail is coupled to the one or more seat tracks. The vehicle further includes a seating assembly including a cantilevered biasing member and one or more electrical contacts. The cantilevered biasing member is configured to maintain an electrical connection between the at least one conductive rail and the one or more electrical contacts as the seating assembly is moved along the one or more seat tracks.

Embodiments of the third aspect of the disclosure can include any one or a combination of the following features:
- the cantilevered biasing member includes a plurality of prongs each corresponding to at least one of the one or more electrical contacts; and
- at least one of the one or more electrical contacts provides power to the track-mounted component and another of the one or more electrical contacts is provides a data signal to the track-mounted component.

These and other aspects, objects, and features of the present disclosure will be understood and appreciated by those skilled in the art upon studying the following specification, claims, and appended drawings.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle track assembly comprising:
   a conductive rail coupled to the track assembly, the conductive rail comprising an electrically insulative substrate and one or more conductive strips attached to the substrate; and
   a track-mounted component electrically coupled to the conductive rail, the track-mounted component comprising a cantilevered biasing member and one or more electrical contacts, wherein the cantilevered biasing member biases the one or more electrical contacts toward the one or more conductive strips to maintain an electrical connection between the one or more electrical contacts and the one or more conductive strips as the track-mounted component is moved along the conductive rail, and wherein the conductive rail provides electrical power to a motor, and wherein the cantilevered biasing member is integrally formed with a motor housing.

2. The vehicle track assembly of claim 1, wherein the cantilevered biasing member comprises an electrically insulative material.

3. The vehicle track assembly of claim 1, wherein the one or more electrical contacts are removably coupled to the motor.

4. The vehicle track assembly of claim 1, wherein at least one of the one or more conductive strips transmits a data signal.

5. The vehicle track assembly of claim 1, wherein the one or more electrical contacts comprise a rounded tip.

6. The vehicle track assembly of claim 1, wherein the cantilevered biasing member comprises a plurality of cantilevered biasing members each corresponding to one of the one or more electrical contacts.

7. The vehicle track assembly of claim 1, wherein the cantilevered biasing member comprises a plurality of prongs wherein each of the plurality of prongs is associated with one of the one or more electrical contacts.

8. The vehicle track assembly of claim 1, wherein the one or more electrical contacts further comprise an annular collar coupled to the cantilevered biasing member.

9. The vehicle track assembly of claim 1, wherein the conductive rail extends along the entire length of the track assembly.

10. The vehicle of claim 1, wherein at least one of the one or more electrical contacts provides electrical power to the track-mounted component and another of the one or more electrical contacts provides a data signal to the track-mounted component.

11. A track assembly comprising:
   a track;
   a conductive rail coupled to the track, the conductive rail comprising an electrically insulative substrate and one or more conductive strips positioned on the substrate;
   a motor assembly coupled to the track and configured to move in a direction parallel to the track, the motor assembly comprising:
      a motor;
      a housing coupled to the motor;
      a cantilevered biasing member coupled to the housing and extending parallel to the conductive rail; and
      one or more electrical contacts coupled to the cantilevered biasing member and electrically coupled to the motor;
   wherein the cantilevered biasing member is configured to bias the one or more electrical contacts toward the one or more conductive strips to maintain an electrical connection between the one or more electrical contacts and the one or more conductive strips such that the one or more electrical contacts may provide an electrical connection between the one or more conducive strips and the motor as the motor assembly is moved along the track, and wherein the cantilevered biasing member is integrally formed with the housing.

12. The track assembly of claim 11, wherein the housing comprises an electrically insulative material.

13. The track assembly of claim 11, wherein the motor assembly further comprises a motor connector such that the one or more electrical contacts are removably coupled to the motor.

14. A vehicle track assembly comprising:
   a conductive rail coupled to the track assembly, the conductive rail comprising an electrically insulative substrate and one or more conductive strips attached to the substrate; and
   a track-mounted component electrically coupled to the conductive rail, the track-mounted component comprising a cantilevered biasing member and one or more electrical contacts, wherein the cantilevered biasing member biases the one or more electrical contacts toward the one or more conductive strips to maintain an electrical connection between the one or more electrical contacts and the one or more conductive strips as the track-mounted component is moved along the conductive rail, and wherein the one or more electrical contacts further comprise an annular collar coupled to the cantilevered biasing member.

* * * * *